(12) United States Patent
Tsirkel et al.

(10) Patent No.: US 7,251,350 B2
(45) Date of Patent: Jul. 31, 2007

(54) METHOD AND APPARATUS FOR ADAPTIVE REALTIME SYSTEM POWER STATE CONTROL

(75) Inventors: Aaron M. Tsirkel, San Jose, CA (US); Wilson X. Huang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 10/279,602

(22) Filed: Oct. 23, 2002

(65) Prior Publication Data
US 2004/0081337 A1 Apr. 29, 2004

(51) Int. Cl.
*G06K 9/00* (2006.01)
*G05B 19/00* (2006.01)

(52) U.S. Cl. .................. 382/118; 382/124; 340/5.83

(58) Field of Classification Search ........ 382/115–124, 382/209, 218, 307; 340/5.82, 5.83; 345/212, 345/214
See application file for complete search history.

(56) References Cited

U.S. PATENT DOCUMENTS

| | | | |
|---|---|---|---|
| 5,918,060 A * | 6/1999 | Jeong ........................ | 713/324 |
| 6,111,517 A * | 8/2000 | Atick et al. ................ | 340/5.83 |
| 6,518,561 B1 * | 2/2003 | Miura ........................ | 250/221 |
| 6,766,040 B1 * | 7/2004 | Catalano et al. ............ | 382/115 |
| 6,810,135 B1 * | 10/2004 | Berenz et al. .............. | 382/118 |
| 6,873,261 B2 * | 3/2005 | Anthony et al. ............ | 340/574 |
| 6,879,710 B1 * | 4/2005 | Hinoue et al. .............. | 382/124 |
| 6,900,798 B2 * | 5/2005 | Heie .......................... | 345/211 |
| 6,995,747 B2 * | 2/2006 | Casebolt et al. ............ | 345/157 |

* cited by examiner

*Primary Examiner*—Daniel Mariam
(74) *Attorney, Agent, or Firm*—Blakely, Sokoloff, Taylor & Zafman LLP

(57) ABSTRACT

Method and Apparatus of the present invention provides innovative real-time system power management with respect to user presence by using an image-capturing device and computer vision technology. The image-capturing device is to capture an image that includes an area in front of a computer system. The image is to be analyzed to determine the user presence. When it is determined that the user is not present, one or more components of the computer system is placed in a power saving mode.

30 Claims, 9 Drawing Sheets

METHOD AND APPARATUS FOR ADAPTIVE REALTIME SYSTEM POWER STATE CONTROL

FIELD OF INVENTION

The present invention relates generally to computer systems and more specifically to power management for computer systems.

BACKGROUND

Computer systems are becoming increasingly pervasive in our society, including everything from small handheld electronic devices, such as personal digital data assistants and cellular phones, to application-specific electronic components, such as set-top boxes and other consumer electronics, to medium-sized mobile and desktop systems to large workstations and servers. With deployment of wireless technology, the battery life became very critical characteristic of mobile systems.

To provide more powerful computer systems for consumers, designers strive to continually increase the operating speed of the processor. A by-product of increasing processor speed is an increase in the amount of power consumed by the processor. The increased system power consumption result in need for bigger thermal/cooling system, bigger power delivery system and reducing battery life.

One approach to reducing power consumption of a computer system is based on a Display Power Management System (DPMS) protocol. DPMS is used to selectively shut down parts of the computer system's video display circuitry after a period of inactivity. With a motherboard and a display that support DPMS, power consumption by the computer system, especially by the display may be greatly reduced. The motherboards that support DPMS often have a BIOS (basic input/output system) setting to enable the power consumption option. The BIOS setting controls a length of time the system must be idle (i.e., no activity detected from the user) for the display to be powered off.

The length of the idle time may be specified in minutes or hours, or it may be set to "Disabled" or "Never". The computer system then tries to detect user's activity during the idle time. User's activities may include, for example, pressing of a key on a keyboard, movement of a mouse, etc. After no activity is detected during the idle time and at expiration of the idle time, the computer system sends appropriate control signals to the display to power off the display. When the display is powered off and the system detects user's activity, the system sends appropriate control signals to power on the display.

Another approach to power management is by setting user's preference using the operating system or application software. For example, power to the display can be managed by setting a power off option in a power management properties menu to a certain fixed expiration value. The expiration value may be set to any value provided in a pop-up window ranging from 1 minute to "never". The expiration value is static and remains the same until another value is selected. FIG. 1 illustrates a prior art example of a pop-up window used to specify power management preferences. As illustrated in FIG. 1, power can be managed by setting user's preference to turn off monitor, hard disks and to put the system in standby mode.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

A method and apparatus for reducing power consumption of computer systems using an image-capturing device is disclosed. For one embodiment, the image-capturing device is coupled to the computer system and is positioned to capture an image of an area in front of the computer system. The image may then be analyzed by the computer system to determine presence or absence of a user.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

For the following discussion, when the user is detected in an image it may be that the user is included in the image wholly or partially, near the middle or toward the side, near the front or toward the back, etc. Although the user may be detected, the user may not be positioned sufficiently in front of a computer system to be considered "present" for the purpose of reducing power consumption of the computer system. For example, the user may be detected in the image but is positioned too far from the computer system to be determined as present.

Figure 1:
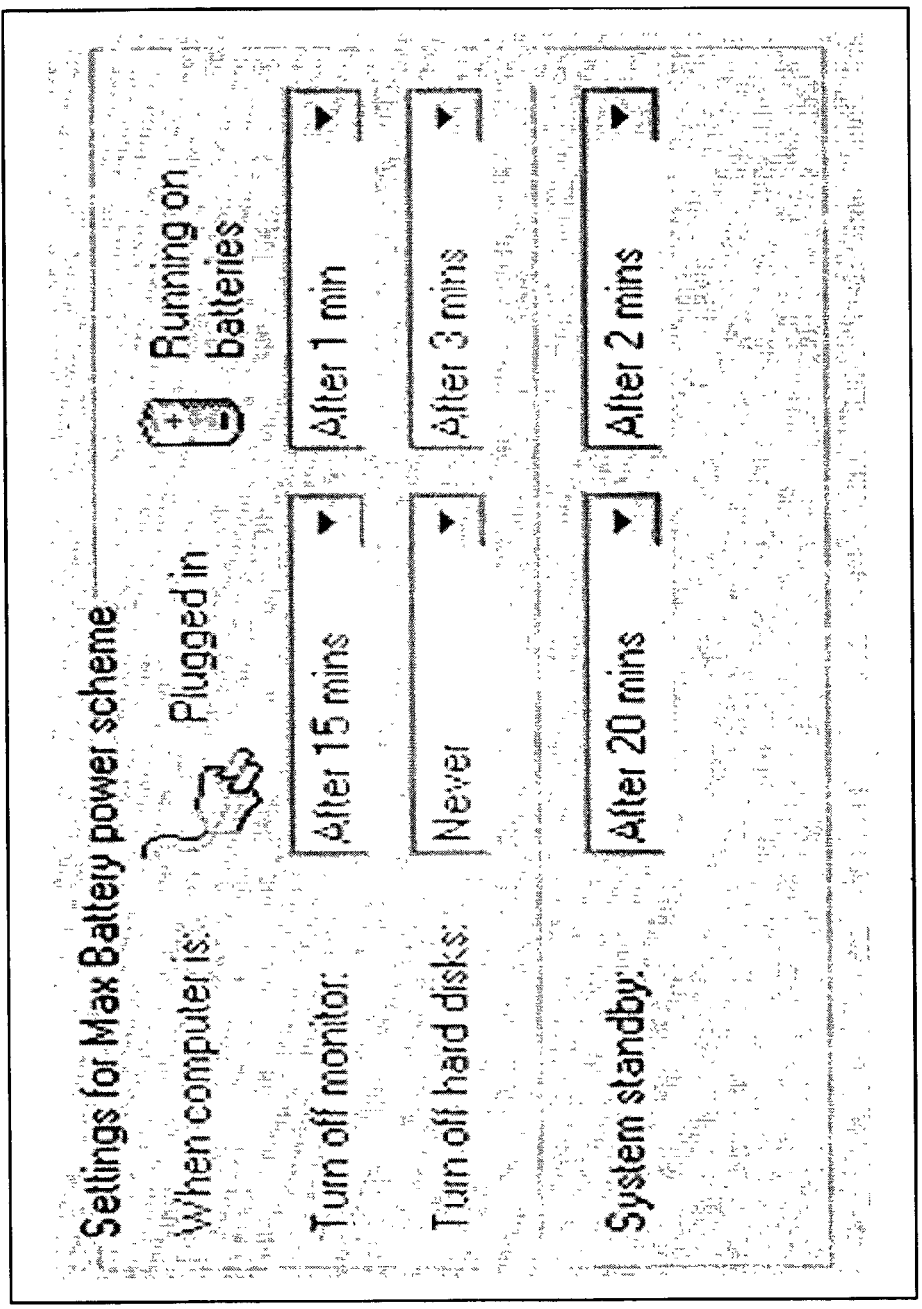
FIG. 1 illustrates a prior art example of a pop-up window used to specify power management preferences.

One disadvantage of the techniques illustrated in FIG. 1 is that there is no reduction in power consumption during the idle time when the computer system is not in use. The idle time of a computer system may be extensive. For example, the idle time may range between approximately 50% and 80% of the total time that a user is supposedly using the computer system. For example, the user may be thinking, reading something on the side, talking to someone on the phone or someone nearby, etc. instead of continuously typing on the keyboard or controlling the movement of the mouse. Thus, it would be advantageous to further reduce the power consumption of the computer system during the idle times.

System

Figure 2A:
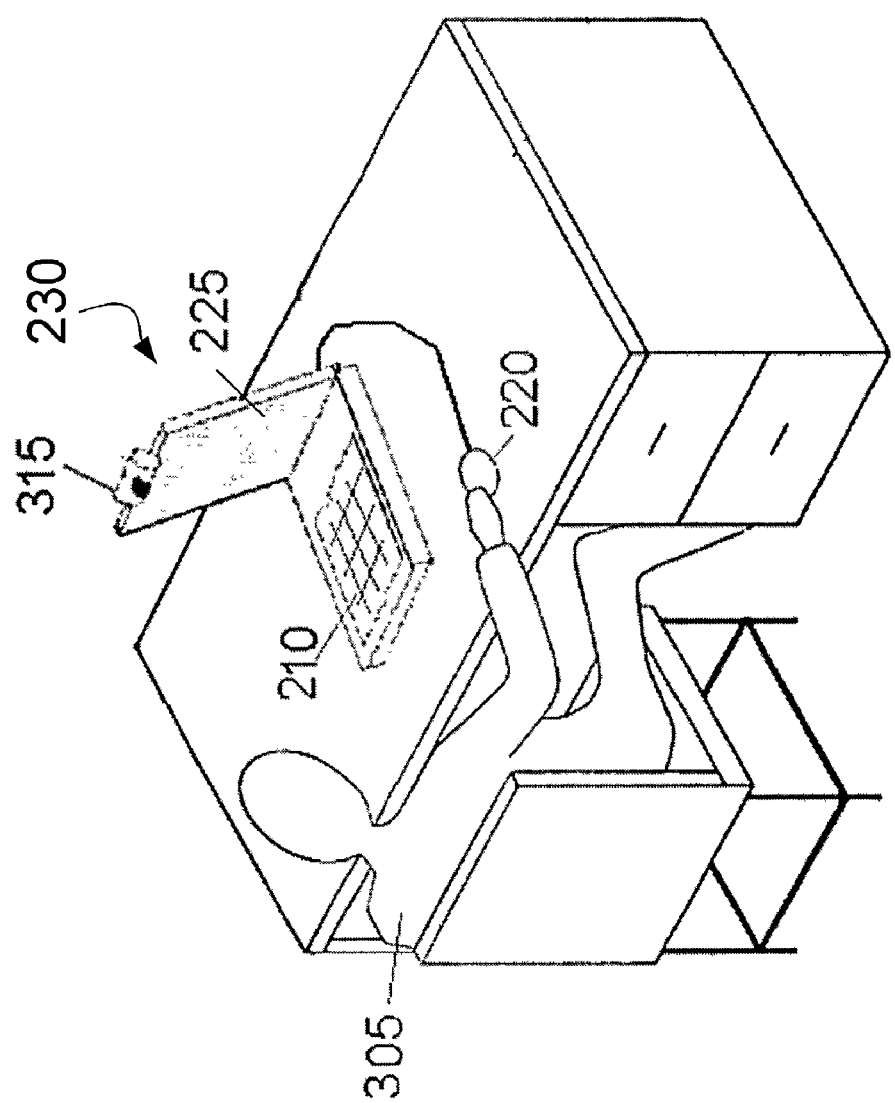
FIG. 2A is a diagram illustrating an example of a computer system according to one embodiment.

FIG. 2A is a diagram illustrating an example of a computer system according to one embodiment. In this example, computer system 230 is illustrated as a portable computer system, although it may also be a non-portable computer system (e.g., a desktop system, a server, etc.). The computer system 230 may draw power from either an alternating current (AC) power source or from a direct current (DC) power source such as, for example, a battery. The computer system 230 may include a keyboard 210, a cursor-control device 220, and a display 225. Although not shown, the computer system 230 may also include other components such as, for example, a processor, a hard drive, etc.

For one embodiment, the computer system 230 may also include an image-capturing device 315 such as, for example, a digital video camera. The image-capturing device 315 may be coupled to the computer system 230 using a coupling device (not shown). Alternatively, the image-capturing device 315 may be integrated in the computer system 230 via the display 225. Other methods for coupling the image-capturing device 315 with the computer system 230 may also be used. For one embodiment, the image-capturing device 315 may be positioned to capture an image of an area in front of the computer system 230. Typically, a user 305 is positioned near or in front of the computer system 230, and the captured image may include an image of the user 305. Depending on the operating platform of the computer system 230 (e.g., Windows, etc), a device driver (not shown) may be used to enable the image-capturing device 315 to interact with the computer system 230.

Figure 2B:
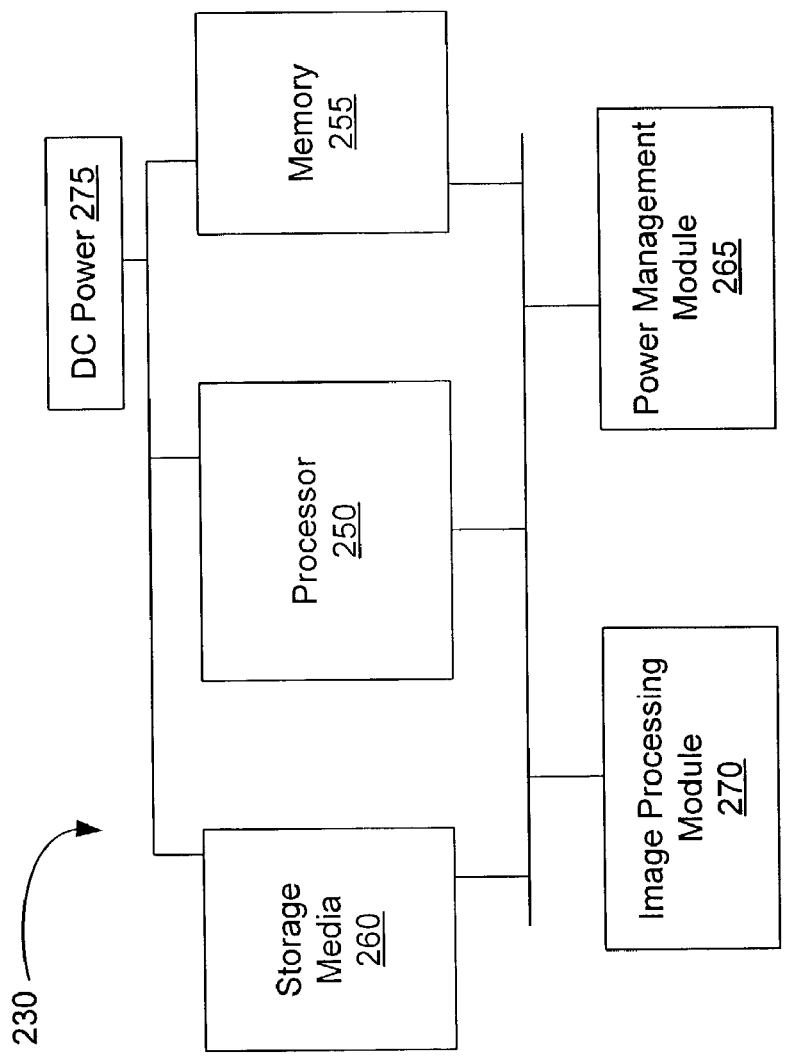
FIG. 2B is a diagram illustrating an example of components in a computer system according to one embodiment.

FIG. 2B is a diagram illustrating an example of components in a computer system according to one embodiment. The computer system 230 may include a central processing unit (CPU) or processor 250, and a memory 255 which may be, for example, random access memory (RAM), read-only memory (ROM), etc. The computer system 230 may also include a storage media 260 which may be, for example, a disk drive, etc. A direct current (DC) power source 275 such as, for example, a battery, may be used to provide power to the components of the computer system 230.

For one embodiment, the computer system 230 may include a power management module 265. The power management module 265 may control power consumption of various components in the computer system 230. For example, the power management module 265 may control power consumption of the display 225, the processor 250, the storage media 260, etc. The power management module 265 may control power consumption of the various components using known techniques. For example, the power management module 265 may control power consumption of the processor 250 using different processor power consumption states (e.g., C0, C1, C2, and C3) as sets forth in the Advanced Configuration and Power Interface (ACPI) Specification (Rev. 2.0a, Mar. 31, 2002). The power management module 265 may be implemented in software, hardware, or a combination of both software and hardware.

Image Processing

For one embodiment, the computer system 230 may include an image-processing module 270. The image-processing module 270 may be used to process an image captured by the image-capturing device 315. The image-processing module 270 may support different image formats so that it can process images captured in different formats by the image-capturing device 315. When the image-processing module 270 receives the image, it may perform various operations to analyze the image. The image-processing module 270 may be implemented in software, hardware, or a combination of both hardware and software.

For one embodiment, a sampling rate may be selected to control the operations of the image-capturing device 315. For example, the sampling rate may enable the image-capturing device 315 to capture an image of the area in front of the computer system 230 based on a selected frequency (e.g., every two seconds). Depending on the situation, the captured image may or may not include an image of the user 305.

Figure 3:
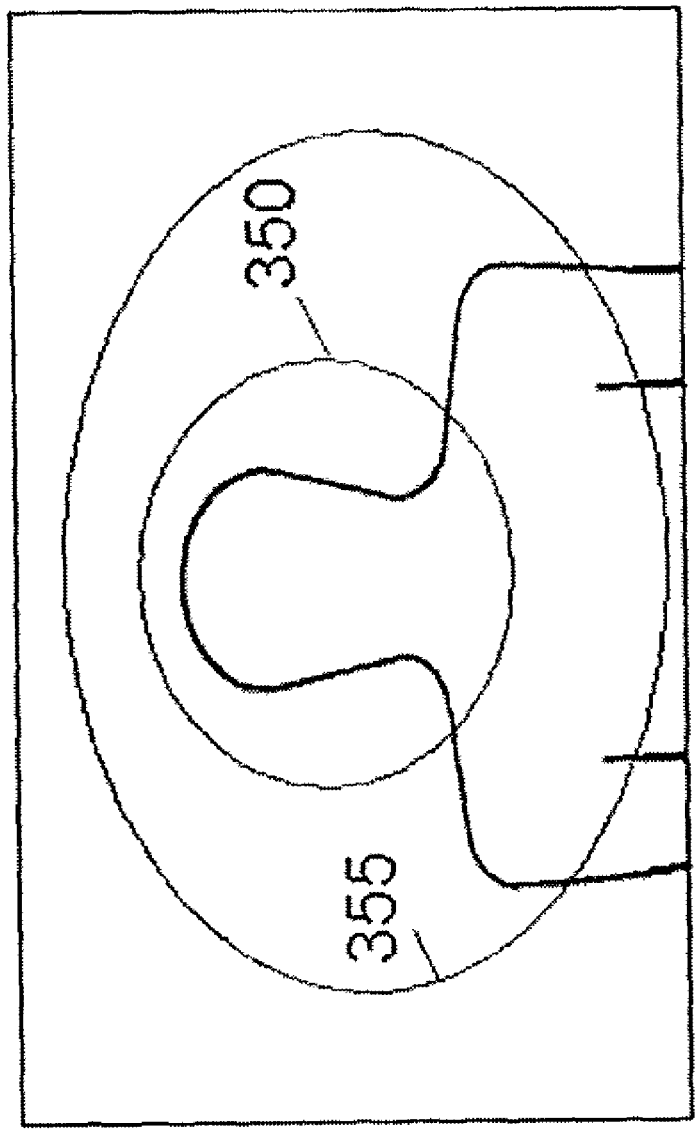
FIG. 3 illustrates an example of a facial image that may be used to detect a user, according to one embodiment.

FIG. 3 illustrates an example of biometric characteristics that may be used to detect a user. For one embodiment, the biometric characteristics may be a facial contour. For example, the biometric characteristics may be detected by identifying the facial contour illustrated as image 350. The facial contour may further be detected by the skin hue, which may be represented using primary colors (red (R), green (G), blue (B)). For example, when the facial contour is detected and the skin hue is also detected within the facial contour, then it's likely that a user's face (an RGB image) is detected, rather than any other object that happens to have a similar contour. There are known techniques that may be used to detect the skin hue. The RGB image of the user's face may be converted into HSV (Hue, Saturation, and Value) color space to reduce variations due to, for example, different types of image-capturing device, different settings, etc. In this example, when the user's face is detected, the user 305 may be considered present provided certain criteria are met.

For one embodiment, a reference image of the user's biometric characteristics may be used to subsequently detect the user in the image. The reference image may be stored for comparison with subsequent captured images. The image-capturing device 315 may capture the reference image when the computer system 230 is powered on each time. The reference image may also be identified by the image-processing module 270 after analyzing multiple captured images and identifying a common subject as the user's biometric characteristics.

The reference image may be stored in the computer system 230 until it is powered off or until another reference image is captured. For example, another reference image may be captured when a new user uses the same computer system 230. A mechanism may be provided to indicate to the computer system 230 that a new user is present. Other techniques may be used to capture the reference image. Furthermore, other techniques may also be used to detect the user's biometric characteristics from the captured image. The reference image may be larger or smaller than the image 350, illustrated as image 355 in the example.

Figure 4:
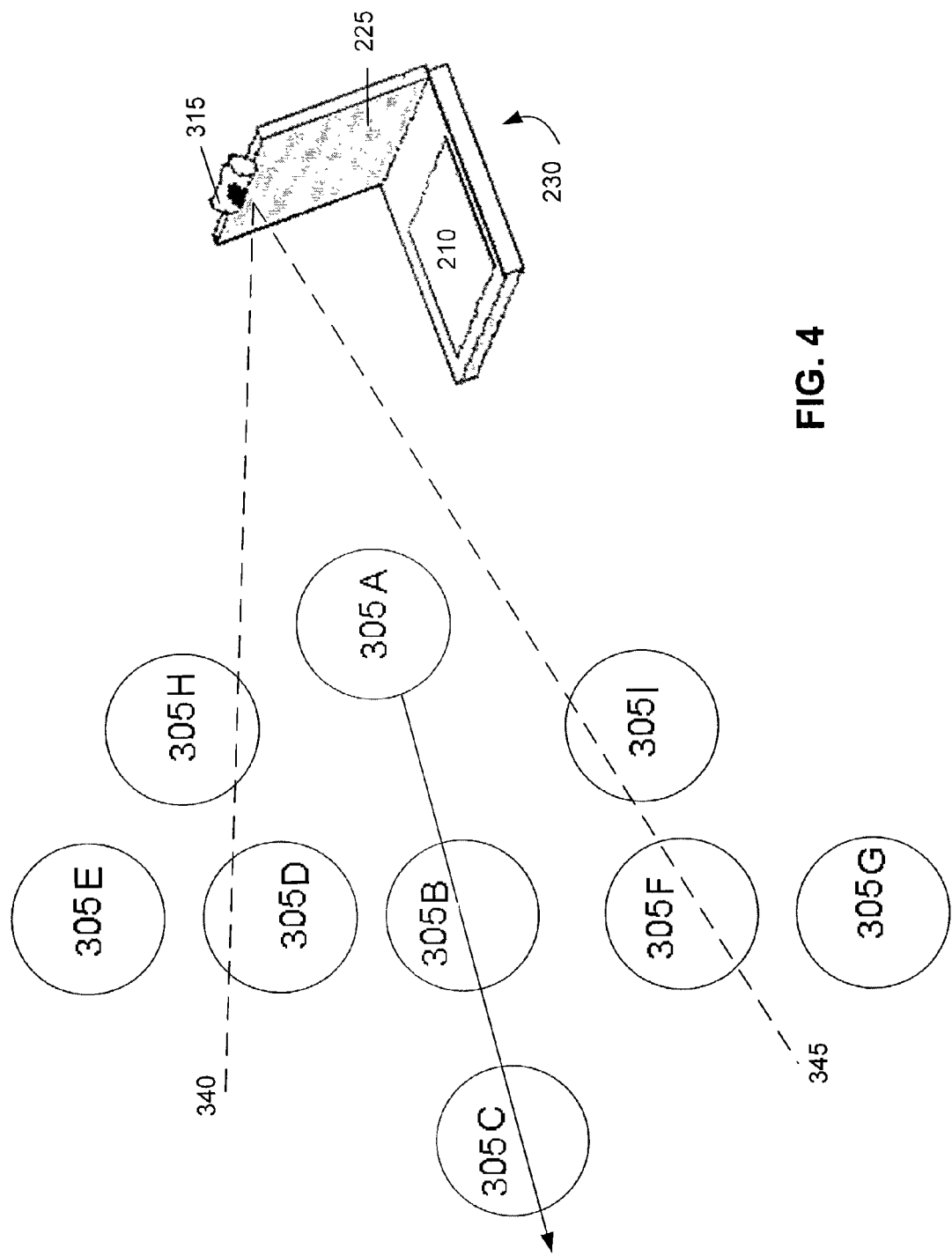
FIG. 4 is a diagram illustrating examples of positions of a user in front of the computer system according to one embodiment.

FIG. 4 is a diagram illustrating examples of positions of a user in front of the computer system. For one embodiment, the user 305 may be detected by the image-processing module 270 in a captured image as long as the user 305 stays within a certain zone in front of the computer system 230. For example, the zone may include an area viewable from a viewfinder (not shown) of the image-capturing device 315.

The zone is illustrated in FIG. 4 as the area between the dotted lines 340 and 345. For example, the image-processing module 270 may be able to detect the user 305 in an image when the user 305 is at position 305A, 305B, or 305C.

For one embodiment, the image-processing module 270 may also be able to detect the user 305 when the user 305 is positioned partially out of the zone, as illustrated in position 305D or 305F. A detection threshold may be used to determine when the user 305 is detected. For example, the detection threshold may be set at ninety (90) percent, and when 90 percent or more of the facial contour is detected, it may be concluded that the user 305 is detected. Thus, the user 305 would not be detected in the image when being only partially in the zone, as illustrated in position 305H or 305I. Of course, the user 305 would not be detected when being completely out of the zone, as illustrated in positions 305E and 305G.

For one embodiment, although the user 305 may be detected in the image, the user 305 may be positioned too far from the computer system 230 to be considered present, as illustrated in position 305C. A presence threshold may be used to determine presence or absence of a detected user. For example, the presence threshold may specify an acceptable size of the detected biometric characteristics (e.g., facial contour). The presence threshold may also specify an acceptable area of detected skin hue. Other techniques may also be used to make the presence determination depending on the biometric characteristics.

Figure 5:
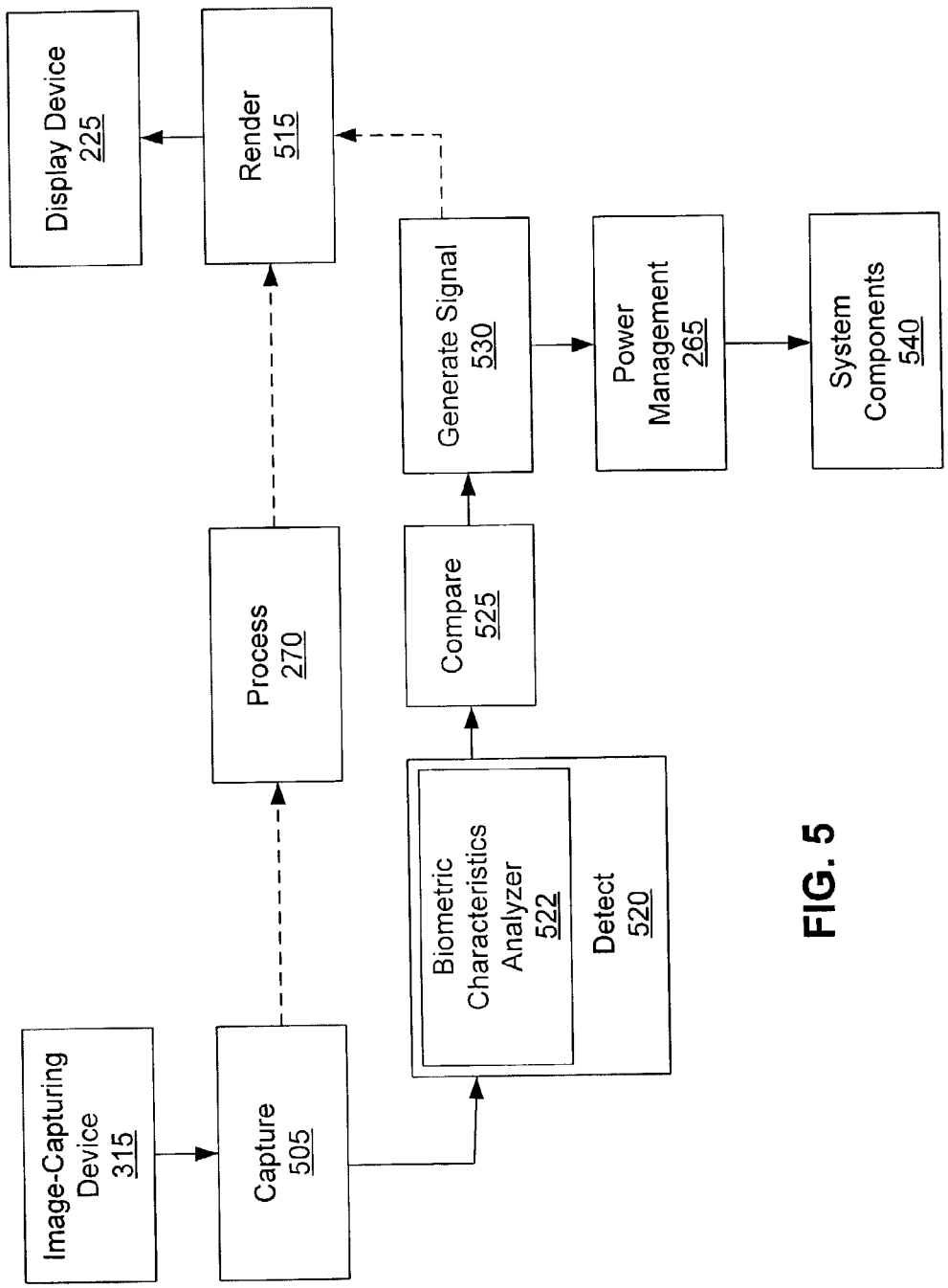
FIG. 5 is a block diagram illustrating an example of the image-processing module according to one embodiment.

FIG. 5 is a block diagram illustrating an example of an image-processing module in a computer system, according to one embodiment. In a capture and playback multimedia application, the computer system 230 may include an image-capturing module 505, an image-processing module 270 and an image-rendering module 515. The image-capturing module 505 may be used in conjunction with a device driver and the image-capturing device 315 to receive an image captured by the image-capturing device 315. The captured image may be processed by the image-processing module 270 and then rendered by the image-rendering module 515 on the display 225. For example, the capture and playback multimedia application may be based on DirectShow architecture by Microsoft Corporation of Redmond, Wash. DirectShow provides filters that support capturing and processing of images. DirectShow filters may include a source filter that receives and presents raw image data for processing, a process filter that processes the image data, and a render filter that presents the processed image data. These filters are connected to one another to form a filter graph, and the raw image data is taken from the first filter to the last filter in the filter graph.

For one embodiment, the image-processing module 270 may include detect module 520, compare module 525, and generate power signal module 530. The detect module 520 may include biometric characteristics analyzer 522 to analyze the contents of the captured image provided by the image-capturing module 505 to detect the user 305. For example, the biometric characteristics analyzer 522 may correlate a common feature across the entire captured image. The common feature may be, for example, facial contour and/or facial skin hue, as described above. The detected feature may then be provided to the compare module 525. Of course, when the user is not present, the biometric characteristics analyzer 522 may not be able to detect the user 305.

The compare module 525 may compare the output of the detect module 520 against a set of defined criteria. The criteria may include presence threshold to determine whether the detected biometric characteristics includes sufficient data to conclude that the user 305 is present. For example, when the detected facial contour is large in size and a large area of skin hue within the detected facial contour is also detected, there is a high likelihood that the user 305 is present.

When a stored reference image is used, the compare module 525 may compare the output of the detect module 520 with the reference image. For one embodiment, when there is no previously stored reference image and the user 305 is detected by the detect module 520, the detected biometric characteristics may be used as the reference image for subsequent operations. Using a match threshold, the compare module 525 may determine whether the user is present in the image. For example, the match threshold may be used to determine when the detected image and the reference image are considered to match even though there may not be an exact match.

For one embodiment, the output of the compare module 525 is provided to the generate power signal module 530. Of course, when the user is not detected by the detect module 520, the user 305 is considered to be absent (e.g., not positioned in front of the computer system 230).

When it is determined that the user 305 is absent, the generate power signal module 530 may generate a signal to indicate to the power management module 535 to place the computer system 230 in a power saving mode. The power management module 535 may then take appropriate actions to reduce the power consumptions of one or more components of the computer system 230. For example, this may be done by sending power reduction commands to the system components 540. The power management module 535 may include logic to recognize that the power to the system components 540 may already be in the power saving mode.

When it is determined that the user 305 is present, the generate power signal module 530 may generate another signal to indicate to the power management module 535 to keep the system components at active full power mode. When the system components 540 are already operating at the active full power mode, the power management module 535 may not need to take any further action. However, when the system components 540 are in the power saving mode, then the power management module 535 may take appropriate actions to restore the system components 540 to the active full power mode. For example, when the user 305 is facing the computer system 230 and is determined by the image-processing module 270 as being present, the system components 540 may not be placed in power saving mode, even though the user 305 may not be using the keyboard 210 or the cursor control device 220.

For one embodiment, each of the modules 520, 525 and 530 illustrated in FIG. 5 may be constructed as a DirectShow filter, and the image-processing module 270 may be represented as a filter graph that includes, for example, a capture filter 505, a detect filter 520, a compare filter 525, and a generate power signal filter 530. Render filter 515 may be optional in this example. One skilled in the art may recognize that the functions performed by the capture filter 505, the detect filter 520, the compare filter 525 may be combined or expanded into different number of filters.

Power Control Process

Figure 6:
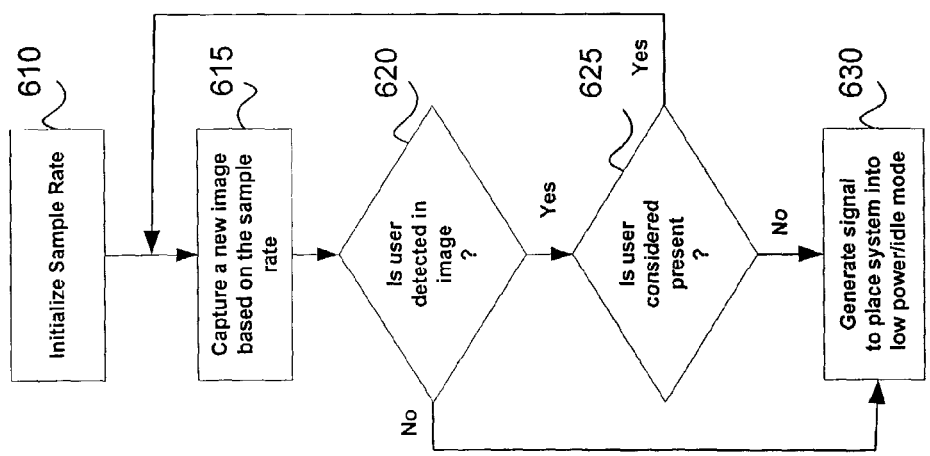
FIG. 6 is a flow diagram illustrating an example of a user detection process according to one embodiment.

FIG. 6 is a flow diagram illustrating an example of a user detection process according to one embodiment. In this example, the user 305 is using the computer system 230 and the process is used to detect whether the user 305 continues to be present in front of the computer system 230. At block 610, a sampling rate is set. The sampling rate may be used to determine a frequency when an image is to be captured by the image-capturing device 315.

At block 615, based on the sampling rate set in block 605, an image is captured by the image-capturing device 315. The sampling rate may set such that the detection process is responsive to absence or presence of the user 305. When the image is captured, it may be analyzed to detect the user 305, as illustrated in block 620. It may be noted that the user may be at a different position each time an image is captured, as illustrated in FIG. 4. As described above, the user 305 may be detected in the image, for example, by detecting facial contour and/or skin hue. When the user 305 is not detected in the image, the process flows to block 630. At block 630, one or more signals are generated to reduce power consumption of one or more components in the computer system 230.

From block 620, when the user 305 is detected in the image, the process flows to block 625 where a test is made to determine if the detected user is considered to be present. For example, the test may be performed using the presence threshold. As another example, the test may be performed using the reference image and the match threshold. When the user 305 is considered to be present, the process flows from block 625 to block 615.

From block 625, when the user is considered to be absent, the process flows to block 630. At block 630, one or more signals are generated to reduce power consumption of one or more components in the computer system 230.

Figure 7:
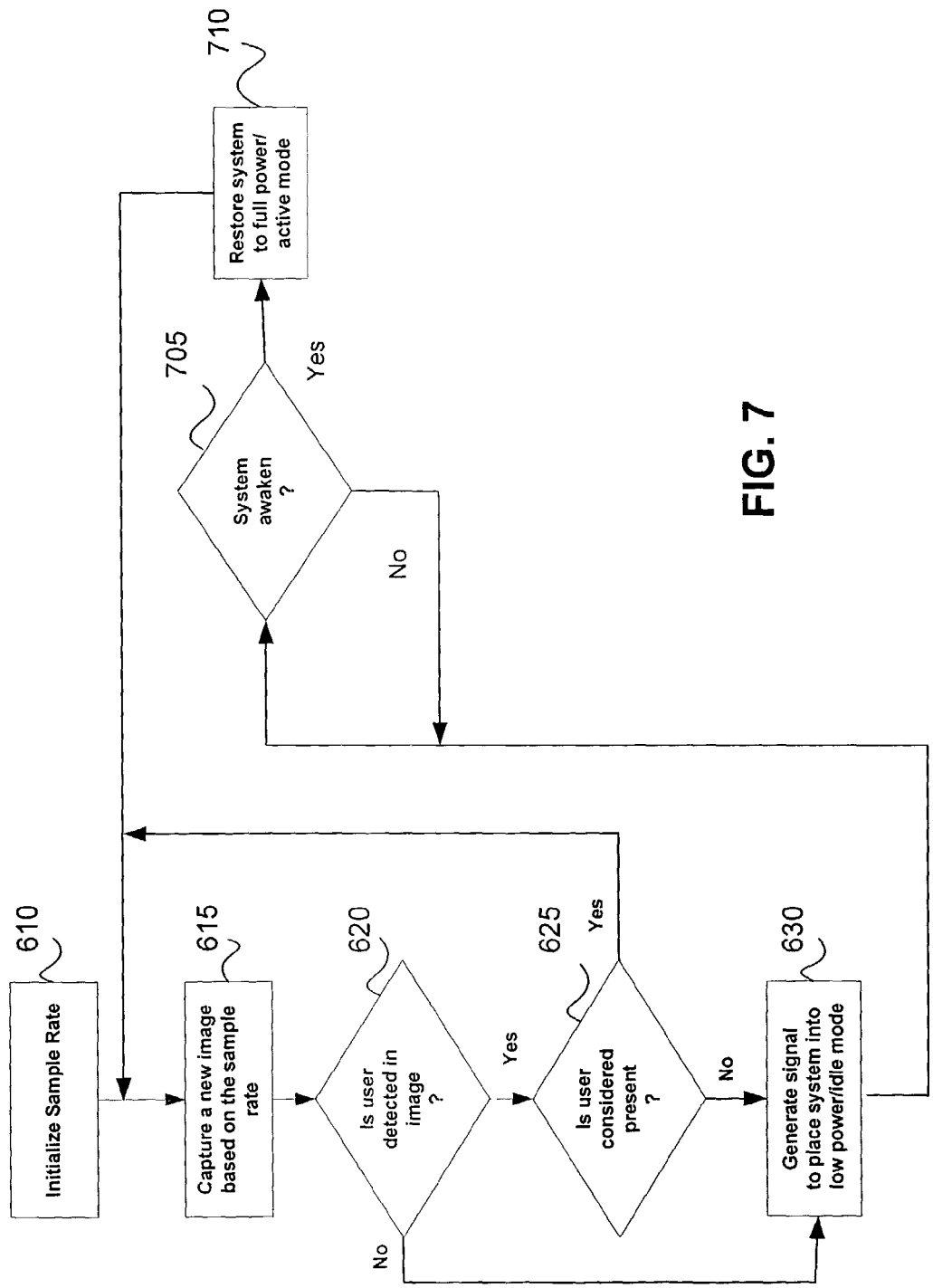
FIG. 7 is a flow diagram illustrating an example of system awaking process.

FIG. 7 is a flow diagram illustrating an example of a system awaking process. This process includes operations similar to the process described in FIG. 6 up to and including block 630. At block 705, a test is made to determine whether the computer system 230 is to be awakened. For example, the computer system 230 may be awakened when the user 305 enters a keystroke at the keyboard 210. Other techniques may also be used to awaken the computer system 230. At block 710, power is restored to bring the computer system 230 and its components to an active state (normal or full power mode). At this stage, the user 305 is considered to be present. The process continues at block 615 where a next image is captured and the determination of the user's presence resumes.

For one embodiment, the power saving mode may be accomplished by decreasing the power used by one or more components in the computer system 230, whenever applicable. For example, power consumption of the display 225 may be reduced by dimming its display brightness level. For another embodiment, the power saving mode may be accomplished by reducing power consumption to zero, thereby essentially powering off the component.

Figure 8:
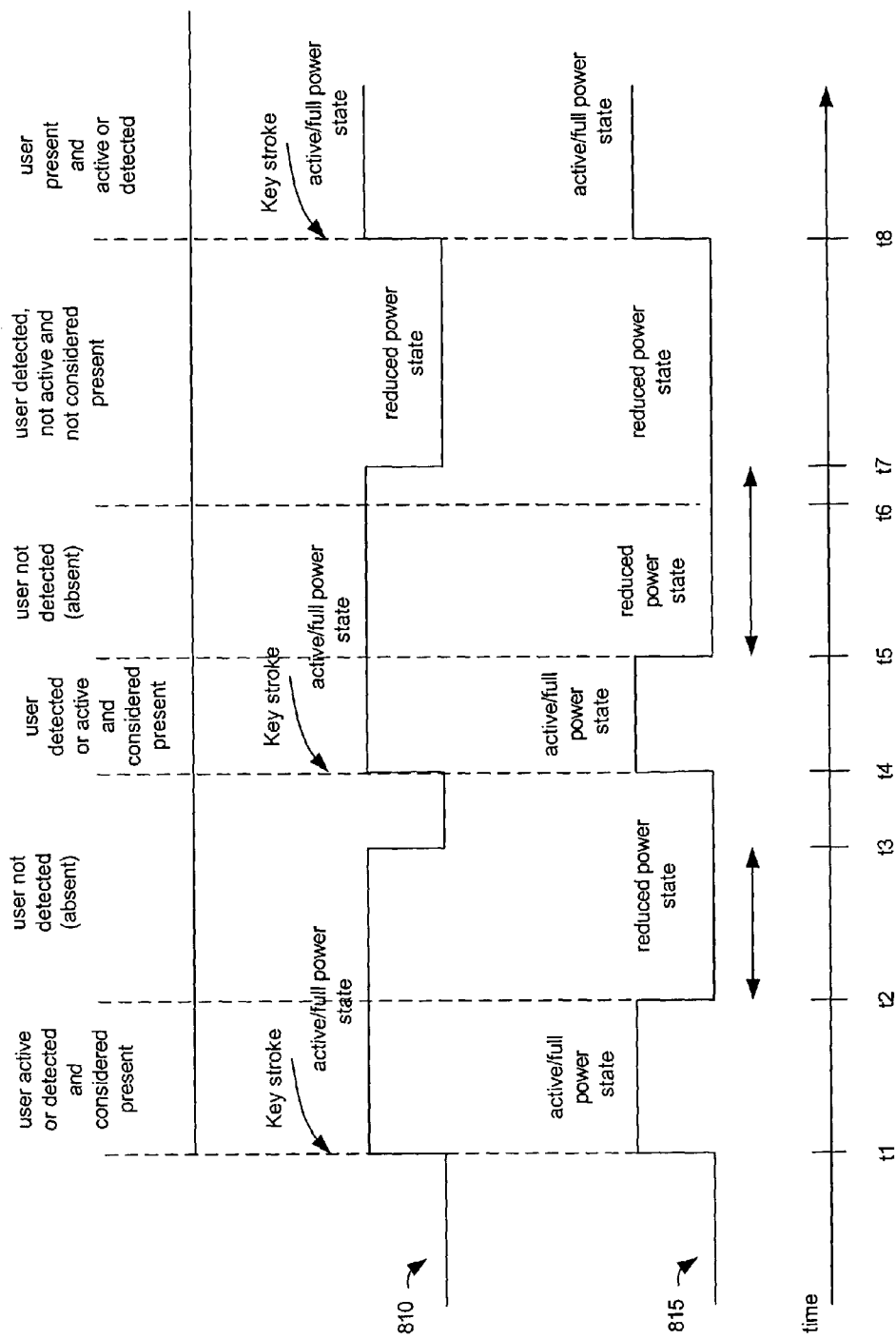
FIG. 8 includes several timing diagram examples to illustrate power saving provided by embodiments of the present invention.

FIG. 8 includes several timing diagram examples to illustrate power saving provided by embodiments of the present invention. Time is illustrated moving from left to right from times t1 to t8. Listed at the top of FIG. 8 are some examples of different user states that may be detected by the computer system 230 and its image-processing module 270. For one embodiment, for the purpose of determining presence of the user 305, the user 305 may be considered present when the user 305 is actively using the computer system 230. For example, the user 305 may use a wireless keyboard to enter information from a distance.

The different user states may include a state when the user 305 is present (referred to as "present state") and a state when the user 305 is absent (referred to as "absent state"). The present state may include (1) when the user is active (and thus present), and (2) when the user is not active, detected in the image, and considered present by the image-processing module 270. The absent state may include (1) when the user is not detected in the image (e.g., from times t2 to t4, and t5 to t6), and (2) when the user is detected in the image, not active, and not considered present by the image-processing module 270 (e.g., from time t6 to t8).

Graph 810 in FIG. 8 illustrates states of the computer system using the prior art techniques of static idle time. For the purpose of demonstrating advantages of embodiments of the present invention over the prior art techniques, a single keystroke is entered at times t1, t4 and t8. The single keystroke may cause the computer system 230 to be placed in an active/full power mode. Using the static idle time technique, the computer system 230 may remain in the active state for the period between times t1 and t3, t4 and t7, and for some times after t8. The computer system 230 may go into a power saving/reduced power mode between times t3 and t4, and between times t7 and t8. This static idle time technique does not take into account presence or absence of the user 305 and may not be efficient because it may force the computer system 230 to remain in the active state longer than necessary.

Graph 815 in FIG. 8 illustrates states of the computer system using techniques of embodiments of the present invention. The computer system 230 is placed into the active state after the keystroke is entered at time t1. The computer system 230 remains in the active state until time t2. Between times t2 and t4, the computer system 230 is placed in the reduced or power saving mode because the user 305 is not detected in the image and is considered absent. Note that this power saving mode period between times t2 and t4 is longer than the power saving mode period illustrated in graph 810 during the same time.

Between times t5 and t6, the computer system 230 is placed in the reduced/power saving mode because the user 305 is again not detected in the image and is considered absent. Note that when using the static idle time technique, the computer system 230 remains in the active state during the same time period, as illustrated in graph 810. Between times t6 and t7, the user is detected in the image but is not considered present by the image-processing module 270. As such, the computer system 230 is placed in the reduced/power saving mode. Note that when using the static idle time technique, the computer system 230 remains in the active state during the same time period, as illustrated in graph 810.

Thus, for the same situations, the graph 815 illustrates that the computer system 230 may be placed in the reduced/power saving mode using the present techniques more often than the static idle time technique illustrated in the graph 810. For one embodiment, the present techniques may be used in conjunction with the prior art idle activity techniques to provide further power saving. For example, the computer system 230 may include an activity detection module that allows a short idle time to elapse before using the image capturing module to capture an image to be analyzed by the image processing module.

Computer Readable Media

The operations of these various methods may be implemented by a processor in a computer system, which executes sequences of computer program instructions which are stored in a memory which may be considered to be a machine-readable storage media. For example, the computer system may be the computer system 230, and the machine-readable storage media may be the storage media 260 illustrated in FIG. 2B. The memory may be random access memory (RAM), read only memory (ROM), a persistent storage memory, such as mass storage device or any combination of these devices. Execution of the sequences of instruction causes the processor to perform operations according to one embodiment the present invention such as, for example, the operations described in FIG. 6 and FIG. 7.

Techniques for reducing power consumption in computer systems using an image-capturing device have been disclosed. The techniques may operate in real time allowing power consumption to be reduced shortly after absence of the user is determined. The techniques may reduce wasted power during the idle times resulting in additional power saving. The techniques may also prevent annoying situations experienced with prior art techniques when the displayed is powered off while the user is viewing information on the display.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A system, comprising:
    a camera image-capturing device configured to capture an image of an area in front of a display associated with mobile computing device of the system, wherein an image of a user is to be included in the image when the user is using the system;
    an image-processing module in the mobile computing device coupled to the image-capturing device, wherein the image-processing module is to analyze the captured image to determine if the system is to be placed in a power saving mode and to analyze the captured image to determine a presence of the user; and
    a DC power source to supply power to the image-capturing device, the display, and the image-processing module, wherein a power management component cooperating with the DC power source to place the system in a power saving mode based on the image of the user not being detected in the area in front of a display associated with mobile computing device.

2. The system of claim 1, wherein the image-processing module is to analyze the captured image to detect biometric characteristics of the user.

3. The system of claim 2, wherein the biometric characteristics includes a facial contour.

4. The system of claim 1, further comprising a power management module coupled to the image-processing module, wherein the image-processing module is to generate a first signal to be received by the power management module when it is determined that no user is present.

5. The system of claim 4, wherein, responsive to receiving the first signal from the image-processing module, the power management module is to place the system in the power saving mode.

6. The system of claim 5, wherein the power management module is to place the system in the power saving mode by reducing power consumption of one or more components in the system.

7. The system of claim 1, wherein the image-capturing device is to capture digital images.

8. The system of claim 7, wherein the image-capturing device is integrated to the display.

9. The system of claim 1, wherein the image-capturing device is to Capture the image based on a sampling rate.

10. The system of claim 9, wherein when presence of the user in the image is determined and the system is in the power saving mode, the image-processing module is to generate a second signal to cause the system to be placed in an active state.

11. The system of claim 1, wherein the image-processing module is to analyze the captured image using a stored reference image.

12. The system of claim 11, wherein the reference image is captured by the image-capturing device at an earlier time.

13. An apparatus, comprising:
    an image-processing module to analyze an image to determine a presence or absence of a user, wherein the image is to include an area in front of a computer system, and wherein an image of the user is to be included in the image when the user is using the computer system;
    a power management module coupled to the image processing module to manage power consumption in response to signals generated by the image-processing module;
    a display;
    a camera image-capturing device to the image of the area in front of a computer system
    a DC power source to supply power to the image-capturing device, the display, the power management module, and the image-processing module, wherein the power management module to cooperating with the DC power source to place the computer system in a power saving mode based on the image of the user not being detected in the area in front of a display associated with the computer system and the image-capturing device, the display, the power management module, and the image-processing module are integrated into a single device.

14. The apparatus of claim 13, wherein when absence of the user is determined by the image-processing module a first signal is to be sent by the image-processing module to the power management module to reduce power consumption of one or more components of the computer system.

15. The apparatus of claim 14, further comprising an image-capturing device coupled to the image-processing module to capture the image to be analyzed by the image-processing module.

16. The apparatus of claim 15, wherein the image-capturing device is to capture the image based on a selected sampling rate.

17. The apparatus of claim 13, wherein the image-processing module is to further analyze the image to detect biometric characteristics of the user.

18. A method, comprising:
    capturing an image with a camera that includes an area in front of a display coupled to a computer system, wherein an image of a user is to be included in the captured image when the user is using the computer system;
    capturing the image based on a sampling rate;
    analyzing the captured image to determine if the user is positioned in front of the display;
    detecting if biometric characteristics of the user exists in the image when analyzing if the user is positioned in front of the display;
    powering the camera with a DC power source; and
    placing one or more components of the computer system in a power saving mode when the user is not positioned in front of the display.

19. The method of claim 18, further comprising:
generating a signal to indicate that the computer system is to be placed in the power saving mode when it is determined that the user is not positioned in front of the display.

20. A machine-readable medium including machine readable instructions that, if executed by a computer system, cause the computer system to perform a method comprising:
capturing an image with a camera including an area in front of a display coupled to the computer system using a digital image capturing device, wherein an image of a user is to be included in the captured image when the user is using the computer system;
capturing the image based on a sampling rate;
detecting if biometric characteristics of the user exists in the image when analyzing if the user is positioned in front of the display;
powering the camera with a DC power source;
analyzing the captured image to determine if the display is to be placed in a power saving mode.

21. The machine-readable medium of claim 20, wherein analyzing the captured image comprises:
determining if the user is present in front of the display; and
placing the display in the power saving mode when the user is not present in front of the display.

22. The machine-readable medium of claim 21, wherein determining if the user is present in front of the display comprises detecting biometric characteristics of the user in the captured image.

23. The machine-readable medium of claim 22, wherein a detection threshold is used to detect biometric characteristics of the user in the captured image.

24. The machine-readable medium of claim 21, wherein a presence threshold is used to determine if the user is present in front of the display.

25. The machine-readable medium of claim 20, wherein the captured image is to be further analyzed to determine if one or more components in the computer system is to be placed in the power saving mode.

26. A system, comprising:
a direct current (DC) source;
a processor coupled to the DC source;
an image-processing module coupled to the processor; and
camera image-capturing device coupled to the image-processing module, wherein the image-processing module is to analyze a first image captured by the image capturing device using biometric characteristics to control power consumption of one or more components in the system, wherein the first image is to include an image of a user positioned in an area in front of a display coupled to the system when the user is using the system, wherein the DC source to supply power to the processor, the image-processing module, the camera image-capturing device, and the display and the image-capturing device, the display, and the image-processing module are integrated into a single device.

27. The system of claim 26, further comprising a power management module coupled to the image-processing module, wherein the power management module is to receive one or more signals from the image-processing module to control power consumption of one or more components in the system.

28. The system of claim 27, wherein the biometric characteristics includes a facial contour.

29. The system of claim 27 further comprising an activity detection module coupled to the processor, wherein the activity detection module is to monitor user's activity to control the power consumption of the one or more components in the system.

30. The system of claim 29, wherein when no user's activity is detected by the activity detection module during a predetermined period, the image-capturing module is to capture a second image to be analyzed by the image processing module.

* * * * *